Figure 1:
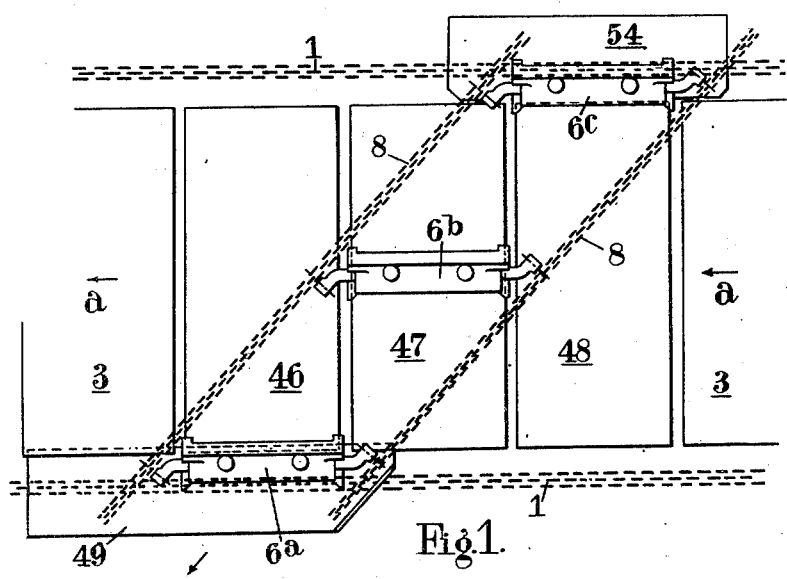

May 30, 1950     A. A. TUNLEY     2,509,322
APPARATUS FOR STRICKLING MOLDS

Filed Dec. 11, 1944     4 Sheets-Sheet 1

Inventor
A. A. Tunley

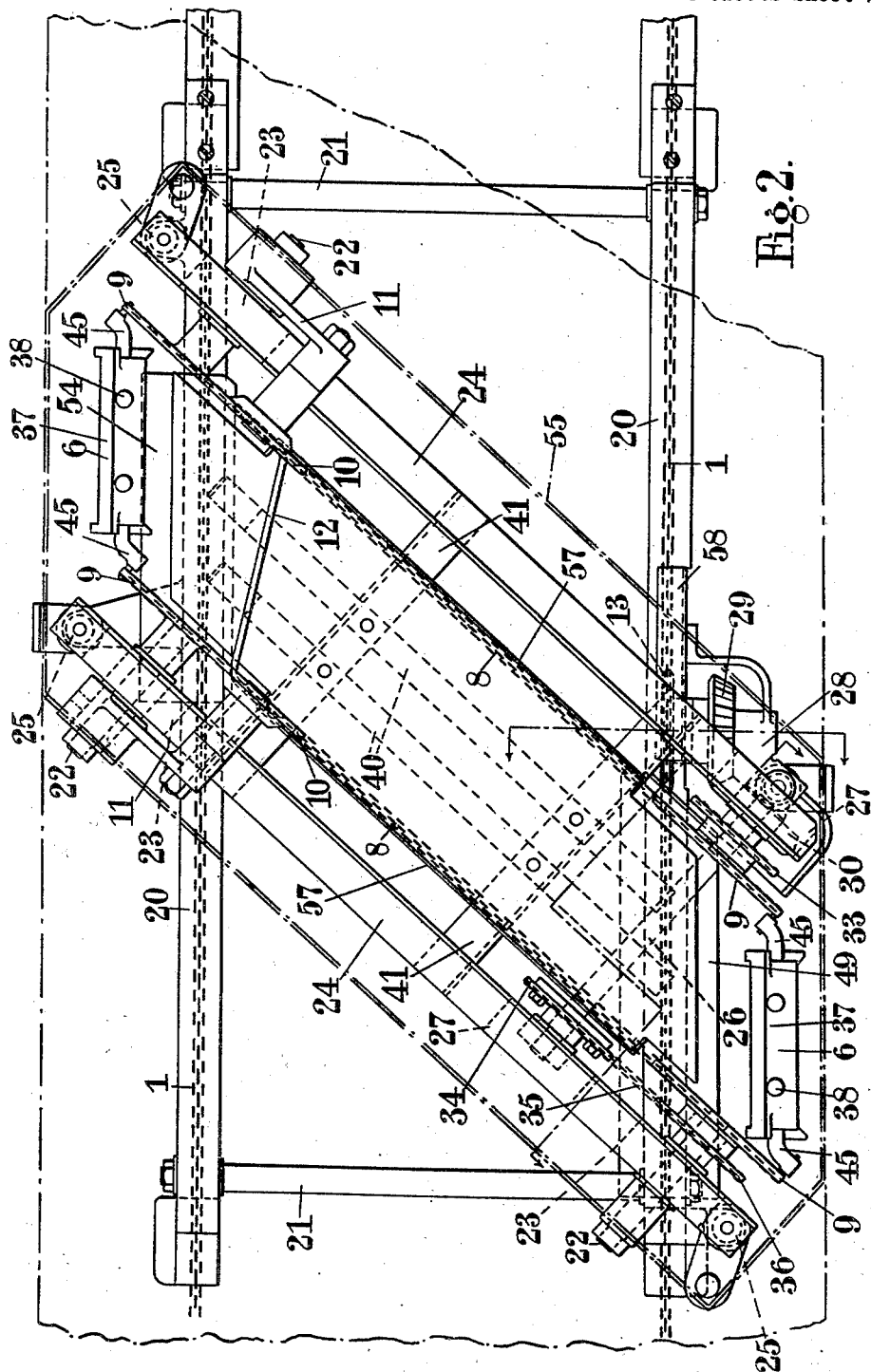

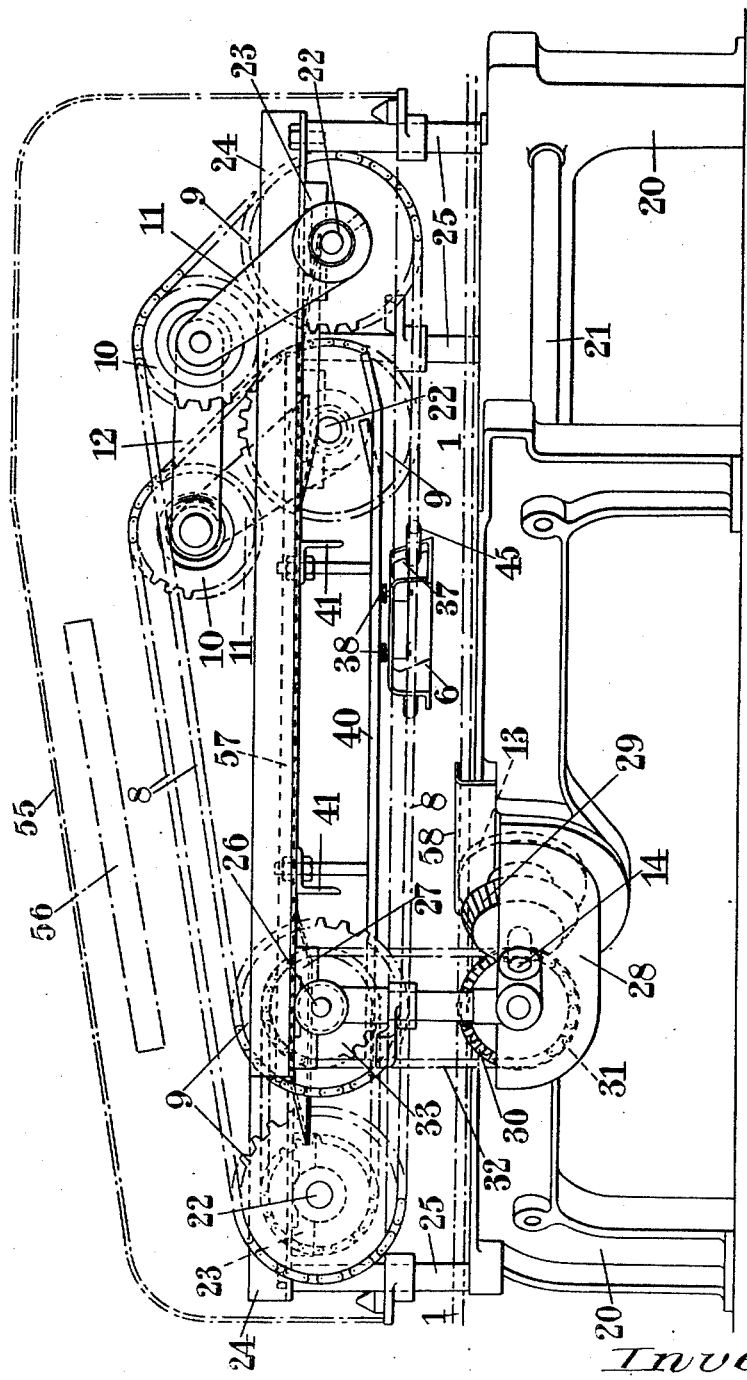

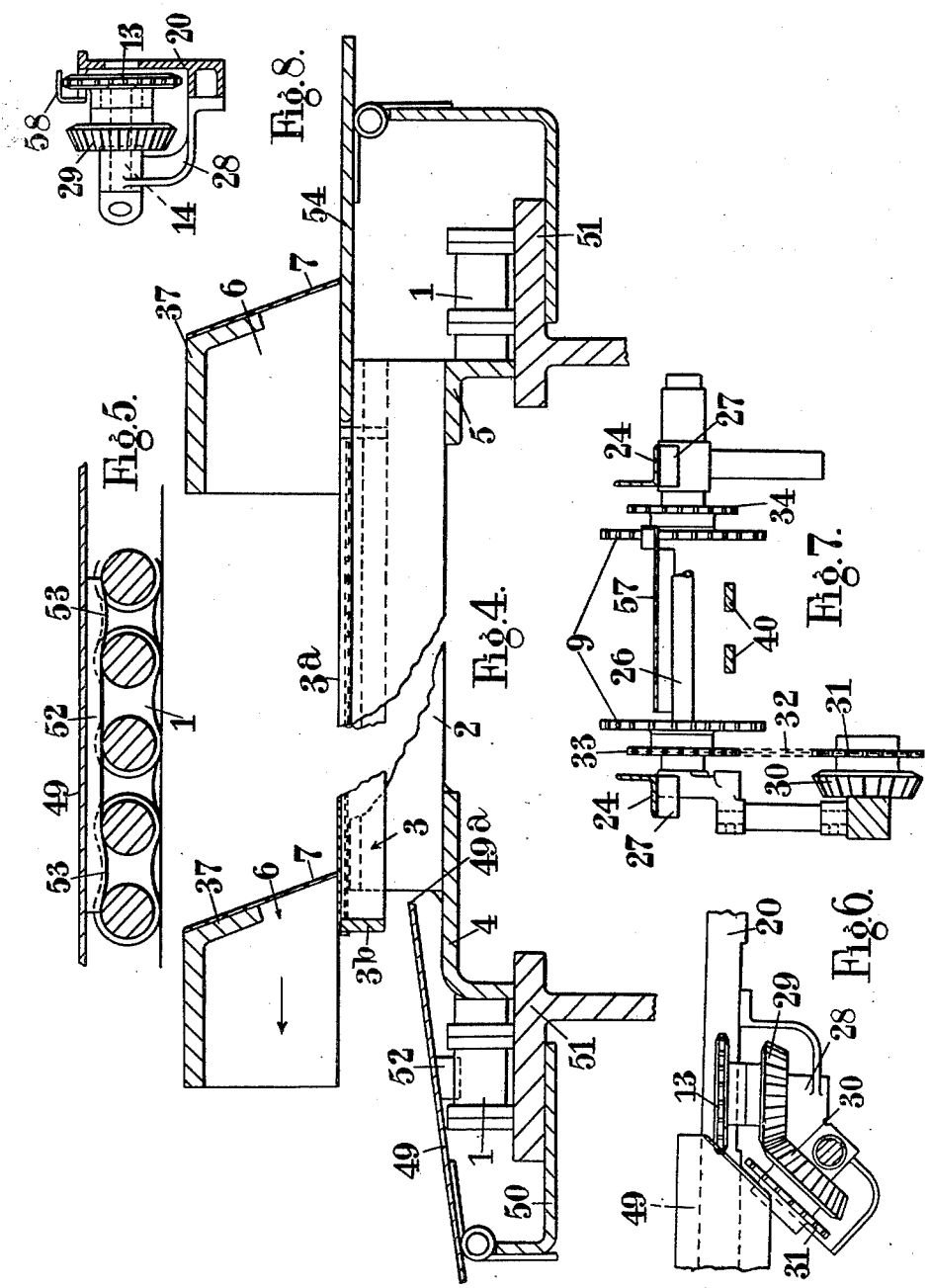

Patented May 30, 1950

2,509,322

UNITED STATES PATENT OFFICE 2,509,322

APPARATUS FOR STRICKLING MOLDS

Allan Ashmead Tunley, Peterborough, England, assignor to Baker Perkins Limited, Peterborough, England Application December 11, 1944, Serial No. 567,718
In Great Britain December 22, 1943

19 Claims. (Cl. 107—8)

1

This invention relates to chocolate or other mould or like trays (hereinafter referred to as moulds) and to conveying and strickling means, such as employed in automatic or semi-automatic or conveying plant where after a deposit of chocolate or other material in the moulds the surplus is strickled off level with the mould edges.

In known machines of the kind above indicated (as employed for chocolate) the moulds are automatically strickled as they are conveyed beneath a fixed strickling blade with the result that the surplus material strickled off is discharged over the trailing edge or lip of each mould in turn and delivered between and below the conveyor chains. This arrangement is unsatisfactory owing to the liability of soiling the working parts and also because of the inconvenience of access to the delivered surplus material. Similar difficulties are encountered where a powdered material is concerned, such as for example in starch moulding plant for confectionery.

An aim of the present invention is to avoid the above objections and to provide a mould mounting and strickling arrangement adapted to deliver surplus material in a manner affording ready access and cleanliness.

The invention also affords an improved strickling effect.

According to the invention strickling is effected in the direction of the length of each mould and transversely to the direction of mould conveyor travel.

The invention consists in a strickling arrangement wherein the strickling means is given a transverse movement obliquely across the path of the moulds, the movement comprising a component in the direction of said path and at the same rate as the mould travel so that the strickling and the mould travel displacements synchronize.

The invention also consists in a strickling arrangement wherein the strickling means are given a continuous movement in an endless path transverse to the mould conveyor path.

The invention further consists in a strickling arrangement as defined in either of the two preceding paragraphs wherein strickling blades are disposed longitudinally of the mould path and moved transversely thereof in succession.

The invention further comprises a transverse strickling arrangement having a strickling station provided with a receiving and delivery platform or chute disposed at the side of the mould conveyor at which the stricklers discharge, the platform being preferably vibrated by means in contact with the adjacent chain (for example the platform may be hinged and have a riding block resting on the chain rollers) to assist in the travel of the discharged material over the platform.

According to the preferred arrangement where mould carriers are employed upon the chains, the carrier slideways terminate lengthwise, short of the vertical plane of the chain path on the strickling discharge side and the platform referred to above overlaps the adjacent conveyor chain. It is also preferred that the moulds should project slightly beyond their carrier ends on the discharge side with a view to enabling the adjacent edge of the platform to lie under the discharge lip of the mould.

Means may be provided which are adapted resiliently to press the strickler means into operative contact with bearers upon the moulds or associated parts.

In the accompanying drawings—

Figure 9:
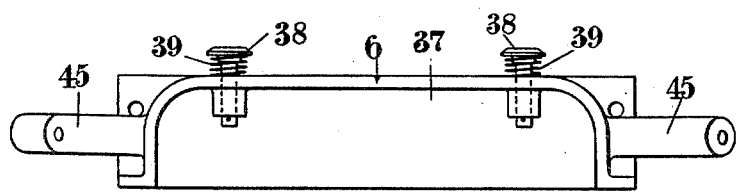
Figure 10:
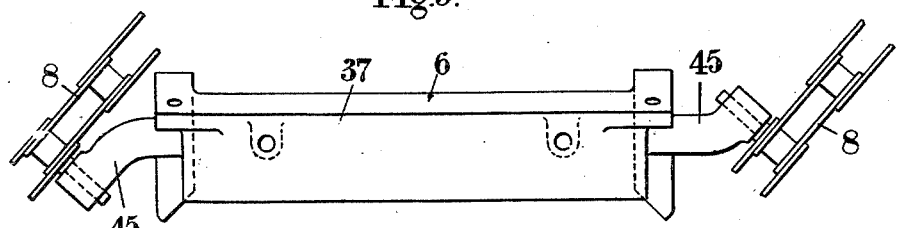
Figure 11:
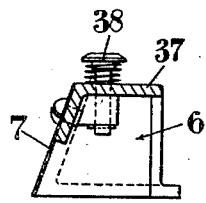

Figure 1 is a diagrammatic plan showing the angular relation of the path of the strickler and the path of the moulds, Figure 2 is a plan of the strickler with the cover removed, Figure 3 is a side elevation corresponding to Figure 2, Figure 4 is a partial cross section transversely of the mould conveyor, Figure 5 is a view of a detail, Figures 6, 7 and 8 are detail views showing the driving of the strickler conveyor from the mould conveyor, and Figures 9, 10 and 11 are views of the strickler means on an enlarged scale.

In carrying the invention into effect according to one mode, as described by way of example as applied to a chocolate moulding plant employing a continuously travelling mould conveyor and where, for instance, a final layer of chocolate is deposited upon a biscuit or other filler inserted in previously deposited chocolate in each of the moulds, the mould conveyor chains I are provided with mould carriers 2 into which the moulds 3 slide transversely of the chains in known manner. The longitudinal edges 3a, that is to say the edges of the moulds which lie at right-angles to the mould conveyor path, are formed to serve as bearers or bearing means for the strickling means or elements as referred to below. The longitudinal sides of the moulds 3 are provided with ribs for engaging and sliding in the carrier slideway grooves in known manner.

The carriers 2 lengthwise terminate short of the chain path on the side on which delivery of the strickled chocolate is to take place and the ends of the carriers are provided with flanged or other plates 4 extending the effective length of the shortened carriers to the side of the chain 1 to which this end of the carriers is to be connected. This connection is made in any suitable manner as by riveting or welding the above flanges 4 to the appropriate chain links.

The opposite ends of the carriers are located inward of the chain path and are connected to the chain links by angle irons 5 or other suitable means. Releasable locking clips of known type may be provided for retaining the moulds 3 in the operative position in the carriers 2.

The moulds 3 are slightly longer than the carriers 2 so that when pushed home they extend somewhat beyond the ends of the carriers on the delivery side and provide a slightly overhanging discharge lip 3b.

A strickling station is located in a suitable position along the chain or conveyor path. At this station and over the chains a series of stricklers or elements 6 is mounted by the aid of side frames 20 arranged parallel with the mould conveyor and connected by stretcher rods 21. Each of these stricklers comprise a strickling blade 7 supported in the manner described below and carried by a pair of endless conveyor chains 8 located in spaced vertical planes so that the stricklers are caused to travel in a closed path. As viewed in plan, see Figure 1, the strickling endless conveyor provided by the chains 8 and stricklers 6 is disposed transversely of and obliquely to the path of travel a—a of the mould conveyor, the strickler chains 8 being preferably located at an angle thereto which may conveniently reside in the neighbourhood of 48°. The chains 8 at each of their turning points are carried by chain wheels 9, the axes of which may be located conveniently adjacent the vertical plane of the path of the mould conveyor chains 1 so that (in plan) the strickler chain wheels 9 on each side of the mould path are staggered. Three of the chain wheels 9 are mounted in stub shafts 22 supported in bearing brackets 23. The bearings 23 are carried by angle bars 24 supported by pillars 25 from the frames 20. The fourth chain wheel 9 is secured to a cross shaft 26 having bearings 27 carried by the angle 24. An inverted jockey chain wheel 10 may be provided for each of the strickler chains 8 to act upon the upper or return lap of the chains and maintain suitable tension. The jockey chain wheels are carried by pivoted arms 11 which are connected by a transverse link 12.

In any suitable position above or below a mould conveyor chain 1 (for example on the delivery side and in the vicinity of the discharge station) a chain pinion 13, mounted on a stub shaft 14, mounted in a bracket 28, meshes with the mould chain 1 for the purpose of communicating a drive from such chain to the endless strickler chains 8. The stub shaft 14 carries a bevel or other gear 29 which through the intermediary of suitable gearing drives the pair of chain wheels at the delivery end of the strickler conveyor. Such intermediate gear comprises a bevel gear 30 to which is secured a chain wheel 31 driving through a chain 32 a chain wheel 33 on the cross shaft 26, thus driving the fourth wheel 9 above mentioned and the chain 8 associated therewith. The other chain 8 is driven from the cross shaft 26 by the chain wheel 34, chain 35 and chain wheel 36 which latter drives the associated chain wheel 9.

As shown the pinion 13 engages the mould chain 1 from below and a guard rail 58 is provided to prevent the chain rising out of engagement with the pinion.

Each strickling means or element 6 comprises an open-fronted box-like arrangement 37 at the back of which is provided a steel or other suitable strickling blade 7 secured by set screws or other means to the rear wall or part of the box. The ends of the box serve laterally to confine chocolate removed by the strickler and prevent its spreading outward of the strickling path.

Upon the upper side of the strickling box 37 a pair of headed pins or plungers 38 are provided and between the heads thereof and the box, the pins are provided with helical springs 39 so that any pressure brought to bear upon the heads is transmitted resiliently to the box. The pins are spaced on the strickling box in the plane of cam rails 40 carried by transverse angles 41 supported by the angles 24, the rails 40 being mounted at an elevation such that when the stricklers 6 in their travel cause the headed pins 38 to engage the cam rails 40 they are slightly depressed and cause the strickling blade 7 to be resiliently pressed upon the bearer surfaces of the mould 3 on which it is operating.

Each strickling box 37 has at each end a cranked or bent arm 45 by means of which it is connected to the appropriate links of the strickler chains 8, the arrangement being such that the strickler blades 7 lie at an angle to the strickler chains 8 and are parallel to the direction of travel of the mould conveyor. By arranging the strickler conveyor at an angle to the mould conveyor of the kind specified above and by suitably spacing the strickling means 6 at intervals on the strickler conveyor chains, a plurality or series of moulds are strickled in succession, or in other words the strickling blades 7 operate in a longitudinal series in succession upon the moulds as they are traversed through the strickling station by their conveyor. According to one arrangement and spacing of the strickling means, see Figure 1, the sequence is such that when the foremost strickler 6a is terminating its strickling effect upon one mould 46 the next strickler 6b is in the mid position in strickling the next following mould 47, while a third strickler 6c is about to commence its strickling traverse of a third mould 48.

It will be appreciated that the number of stricklers operating simultaneously upon the moulds may be varied to suit the size and/or pitch of the moulds or other conditions.

At the end of the strickling path on the discharge side, a receiving and delivery platform or plate 49 is hingedly mounted by a bracket 50 upon a part of the frame of the apparatus or attached to the supporting rails 51 for the mould chains 1. On the underside the plate 49 is provided with a bearer block 52 which has one or more slight cam-like projections 53 adapted to ride upon the rollers of the adjacent mould chain 1 with the result that as the chain travels along, the hinged plate 49 is joggled or vibrated to promote the flow of the chocolate discharged upon the plate by the stricklers 6, downwardly away from the mould conveyor into any suitable collecting receptacle. The end of the plate 49 remote from the hinge is adapted to overlie the flange extension brackets 4 of the carriers 2 as they pass along and underlie the end 3b of the mould 3 which projects, as noted above, slightly beyond the end of the carrier. The extremity 49a of the plate may have an upturned lip, if desired, to prevent any retrograde spilling of the discharged chocolate.

As an alternative to vibrating the plate to assist the movement of the discharged chocolate the plate may be provided with a mechanically operated scraper.

At the opposite end of the strickler conveyor path a hinge plate or platform 54 is provided which overlies the adjacent mould chain 1 and rests upon the adjacent end of each carrier 2 in turn. The carrier ends may be recessed, if necessary, to accommodate the end of the plate so that the upper surface thereof lies flush with the bearer surface on the mould 3 for the strickler blades 7. This platform 54 constitutes a convenient and smooth lead-on for the strickler blades 7 as they terminate their travel around their turning point and commence their oblique strickling path.

The ratio of the gearing from the chain wheel 13 driven by the mould chain 1 is such that the rate of progression in the direction of the component of movement of the strickler blades 7 aligned with the mould path is the same as the mould travel. Thus although the stricklers 6 travel obliquely across the mould path each strickler travels from end to end of the mould upon which it operates, in synchronism with the forward movement thereof.

Cover means 55 may be provided to enclose the strickling apparatus, and suitable heating means 56 may be located adjacent the return path of the stricklers to maintain them at a suitable temperature.

A removable drip tray 57 is mounted upon the cross angles 41 to receive any chocolate that may drop from the stricklers as they move along their return lap.

I claim:

1. Means for strickling a plurality of moulds which are moving on a continuously travelling mould conveyor, comprising a plurality of strickling elements each mounted to move across each mould in a path oblique to the direction of mould travel, with a component of travel in the same direction therewith to deliver excess of material strickled from the moulds at the side of the mould conveyor and means for driving each strickling element at a rate such that a component of its movement is equal to the rate of travel of the mould strickled thereby, whereby the displacements of the strickling element and mould synchronize.

2. Means for strickling the moulds of a travelling mould conveyor as defined in and by claim 1 wherein a plurality of strickling elements move in an endless path oblique to the direction of travel of the moulds.

3. Means for strickling the moulds of a travelling mould conveyor as defined in and by claim 1, comprising an endless conveyor for supporting the strickling elements, said conveyor being movable in an endless path oblique to the direction of travel of the moulds and said elements being spaced apart a distance whereby successive strickling elements synchronize with and strickle successive moulds.

4. Means for strickling the moulds of a travelling mould conveyor as defined in and by claim 1, in which said conveyor includes endless driving chains to which the moulds are connected, an endless conveyor on which the strickling elements are mounted, said last mentioned conveyor being movable in an endless path oblique to the direction of mould travel, said elements lying parallel to the direction of mould travel, said endless conveyor for the strickling elements including driving chains mounted parallel to said oblique path and connected to the ends of said elements and means for driving said last mentioned chains from one of the mould conveyor chains.

5. Means for strickling the moulds of a travelling mould conveyor as defined in and by claim 1 including a platform located at the side of the mould conveyor to receive said excess material strickled from the moulds.

6. Means for strickling the moulds of a travelling mould conveyor as defined in and by claim 1 in which the mould conveyor includes endless driving chains to which the moulds are connected, a platform located at the side of the mould conveyor adjacent one of said driving chains to receive said excess material strickled from the moulds, and means contacting with the said adjacent driving chain for vibrating the platform to facilitate discharge of said material.

7. Means for strickling the moulds of a travelling mould conveyor as defined in and by claim 1, in which the mould conveyor includes endless driving roller chains to which the moulds are secured, a hinged platform located at the side of the mould conveyor adjacent one of said roller chains to receive said excess material strickled from the moulds, a cam block mounted on the platform and contacting the rollers of the said adjacent mould conveyor chain for vibrating the platform to facilitate discharge of said material.

8. Means for strickling the moulds of a travelling mould conveyor as defined in and by claim 1 in which the mould conveyor includes endless side driving chains, mould carriers having slideways connected to said chains, said slideways terminating short of the vertical plane of the conveyor chain on the strickling discharge side, and a hinged platform located at said side to receive said excess material strickled from the moulds, said platform overlapping said conveyor chain adjacent thereto.

9. Means for strickling the moulds of a travelling mould conveyor as defined in and by claim 1 in which the mould conveyor includes endless side driving chains, mould carriers having slideways connected to said chains, said slideways terminating short of the vertical plane of the conveyor chains on the strickling discharge side, moulds supported on said carriers and projecting beyond said carriers on said discharge side, and a hinged platform located at said discharge side to receive said excess material strickled from the moulds as they pass said platform, said platform overlapping the adjacent mould conveyor chain and underlying said projecting portions of the mould.

10. Means for strickling the moulds of a travelling mould conveyor as defined in and by claim 1 in which the mould conveyor includes endless side driving chains, a pair of spaced endless chains mounted above the mould conveyor and lying in planes parallel to said oblique path, a series of strickling elements lying parallel to the direction of travel of said conveyor, crank arms connecting said elements to said second mentioned endless chains, said elements being spaced from one another and at the end of their strickling operation passing upwardly on the return lap of said second mentioned endless chains.

11. Means for strickling the moulds of a travelling mould conveyor as defined in and by claim 1 wherein bearing means are provided on the moulds and wherein resilient means are provided for resiliently pressing the strickling elements into contact with the said bearing means on the moulds.

12. Means for strickling the moulds of a travelling mould conveyor as defined in and by claim 1 wherein each strickling element comprises an open-front box-like structure, the open front facing the direction of travel thereof, and said box-like structure having a rear wall comprising a strickling blade.

13. Means for strickling the moulds of a travelling mould conveyor as defined in and by claim 1, comprising a series of spaced strickling blades movable in a closed path in a vertical plane oblique to the direction of travel of the moulds, the spacing of the moulds on the mould conveyor and the spacing of successive strickling blades being such that three successive blades are in operation, the first being at the end of its strickling movement with relation to one mould, the second blade being halfway across the next adjacent mould, and the third blade being at the commencement of its strickling action with the succeeding mould.

14. Means for strickling the moulds of a travelling mould conveyor as defined in and by claim 1 in which the mould conveyor includes endless side driving chains, a series of spaced strickling elements movable in a closed path in a vertical plane oblique to the direction of travel of the mould conveyor, said elements lying parallel to the direction of mould travel, side driving chains to which the said elements are connected, a cross shaft, sprockets thereon for driving said second mentioned chains, and gearing for driving said cross shaft from one of the mould conveyor chains, said gearing including meshing bevel gears and a sprocket engaging said conveyor chain, one of said bevel gears being connected for rotation with said second mentioned sprocket.

15. Apparatus for strickling moulds and for discharging strickled material therefrom including a continuously traveling mould conveyor, a plurality of moulds thereon each including spaced opposite sides, each parallel to the direction of travel of the conveyor, said conveyor including driven means moving the same and the moulds in a predetermined path of travel, movable strickling means mounted to travel in a path oblique to the line of travel of the mould conveyor and having a component of travel in the same direction therewith, said strickling means moving across the moulds from one of said opposite sides to the other as the same are moving to remove excess material therefrom and discharge the same laterally thereof, means for driving said strickling means at a rate such that a component of its travel is equal to the rate of travel of the moulds so as to synchronize the displacement of the strickling means and each mould and excess material receiving means disposed in the oblique path of travel of said strickling means and mounted at the discharge side of said strickling means and disposed beneath a plane passing through the bottom of said moulds.

16. Apparatus for strickling moulds including a continuously traveling mould conveyor including endless driven means, a plurality of moulds thereon movable therewith in a predetermined path of travel and each mould including spaced opposite sides each parallel to the direction of travel of the conveyor, movable strickling means mounted to travel in a path oblique to the line of travel of the mould conveyor with a component of travel in the same direction therewith, said strickling means moving across each mould from one of said opposite sides to the other while the mould is moving to remove excess material therefrom and discharge the same laterally of the mould, excess material receiving means mounted in the oblique path of travel of said strickling means and overlapping said endless driven means and being disposed beneath the discharge side of each passing mould, means for vibrating said excess material removing means including means mounted thereon and cooperating with said endless driven means to receive vibratory movement therefrom to facilitate discharge of the material, and driving means for said strickling means operatively connected with said endless driven means to receive power therefrom to drive said strickling means at a rate such that a component of its travel is equal to the rate of travel of the moulds so as to synchronize the displacement of the strickling means and each mould.

17. Apparatus for strickling moulds including a mould conveyor including endless drive chains, a plurality of moulds thereon each including spaced opposite sides each parallel to the direction of travel of the conveyor, strickling means including conveying means passing over said moulds in a path oblique to the line of travel to the mould conveyor and with a component of movement in the same direction as the line of travel of the moulds, spaced strickling elements carried by said conveying means, said elements being disposed obliquely with respect to the second mentioned conveyor and parallel with the line of travel of the moulds, means for driving the second mentioned conveying means at a rate such that a component of its movement combined with the spacing between the elements is equal to the rate of travel of a mould so that one element moves from one of said opposite sides of a mould to the other to remove excess material therefrom while the mould is passing beneath said second mentioned conveying means, the said drive means for the second mentioned conveying means including a sprocket mounted beneath one of said endless drive chains and engageable therewith so as to be driven thereby.

18. Apparatus of the type described including a movable mould having excess material therein and including spaced opposite sides each parallel to the direction of movement of the mould, a movable strickling element, means supporting the element for movement across the mould in a path oblique to the line of travel of the mould and with a component of travel in the same direction therewith, and driving means for said element moving the same in synchronism with the mould whereby the element moves from one of said opposite sides of the mould to the other to remove excess material therefrom at the side thereof while the mould is moving.

19. Apparatus of the type described including a mould having excess material therein and including spaced opposite sides each parallel to the direction of movement of the mould, endless driven means supporting the same for movement in a predetermined line of travel, a movable strickling element, means supporting the element for movement across the mould in a path oblique to the line of travel of the mould and with a component of movement in the same direction therewith, driving means for the said element moving the same in synchronism with the mould whereby the element moves from one of said opposite sides of the mould to the other to remove excess material therefrom to discharge the same at the said other side thereof as the mould is moving, and a platform overlapping said driven means lying in said oblique path of movement and beneath the discharge side of the mould to receive said excess material to prevent the same from falling into said driven means.

ALLAN ASHMEAD TUNLEY.

REFERENCES CITED

The following references are of record in the file of this patent:

UNITED STATES PATENTS

| Number | Name | Date |
|---|---|---|
| 1,385,462 | Marvin et al. | July 26, 1921 |
| 2,283,838 | Williams | May 19, 1942 |

FOREIGN PATENTS

| Number | Country | Date |
|---|---|---|
| 614,710 | Germany | June 17, 1935 |